United States Patent [19]

Genz et al.

[11] Patent Number: 5,013,815

[45] Date of Patent: May 7, 1991

[54] AROMATIC POLYETHER SULFONES, A PROCESS FOR THEIR PRODUCTION AND THEIR USE

[75] Inventors: Joachim Genz, Krefeld; Hans-Rudolf Dicke, Bestwig, both of Fed. Rep. of Germany

[73] Assignee: Bayer Aktiengesellschaft, Leverkusen, Fed. Rep. of Germany

[21] Appl. No.: 378,684

[22] Filed: Jul. 10, 1989

[30] Foreign Application Priority Data

Jul. 23, 1988 [DE] Fed. Rep. of Germany ....... 3825148

[51] Int. Cl.$^5$ ............................................. C08G 75/00
[52] U.S. Cl. .................................... 528/171; 528/174; 528/371
[58] Field of Search ........................ 528/171, 174, 371

[56] References Cited

U.S. PATENT DOCUMENTS

| | | | |
|---|---|---|---|
| 4,654,410 | 3/1987 | Kashiwane et al. | 528/171 |
| 4,775,738 | 10/1988 | Mayska et al. | 528/171 |
| 4,816,505 | 3/1989 | Cotter et al. | 528/171 |
| 4,883,855 | 11/1989 | Stockinger | 528/171 |

FOREIGN PATENT DOCUMENTS

| | | |
|---|---|---|
| 0201831 | 11/1986 | European Pat. Off. . |
| 0243833 | 11/1987 | European Pat. Off. . |
| 122192 | 7/1968 | United Kingdom . |

OTHER PUBLICATIONS

Patent Abstracts of Japan, Sanko Kaikatsu K.K., Dec. 1988, Japan.

*Primary Examiner*—Morton Foelak
*Attorney, Agent, or Firm*—Connolly and Hutz

[57] ABSTRACT

The invention relates to aromatic polyether sulfones having new structural features, to a process for their production and to their use.

3 Claims, No Drawings

AROMATIC POLYETHER SULFONES, A PROCESS FOR THEIR PRODUCTION AND THEIR USE

This invention relates to aromatic polyether sulfones having new structural features, to a process for their production and to their use.

The new aromatic polyether sulfones contain as structural element 2',2'''-dihydroxy-m-quaterphenyl corresponding to formula (I)

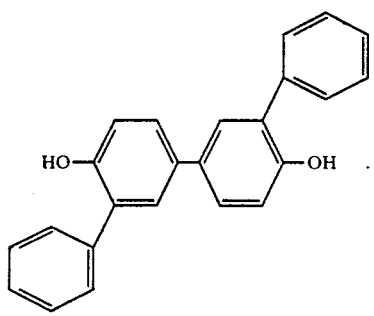

They have a high molecular weight and particularly high thermal stability, favorable processing properties and good mechanical properties.

Aromatic polyether sulfones may be prepared, for example, by reaction of 4,4'-disulfonyl chloride diphenyl ether with biphenyl and by reaction of 4-monosulfonyl chloride diphenyl ether on its own or with 4-monosulfonyl chloride biphenyl (cf. for example GB-PS 1,016,245, 1,106,366, 1,106,367 and 1,122,192).

Although the known polyether sulfones are characterized by high heat resistance, they are difficult to process on account of their high melt viscosities.

It has now been found that polyether sulfones in which 2',2'''-dihydroxy-m-quaterphenyl corresponding to formula (I) is incorporated as structural element show high heat resistance values. They also have low melt indices, even with high molecular weights, and are easy to process.

Accordingly, the present invention relates to aromatic polyether sulfones of high molecular weight, characterized in that they contain 2',2'''-dihydroxy-m-quaterphenyl incorporated in a concentration of from 1 to 100 mol-%, based on the total quantity (in mol) of bisphenol component used.

The present invention also relates to high molecular weight, aromatic polyether sulfones prepared from 2',2'''-dihydroxy-m-quaterphenyl and, optionally, one or more other aromatic dihydroxy components and at least one aromatic dihalogen compound containing a sulfone group using an alkali compound in the presence of an inert, polar organic solvent.

Polycondensation reactions leading to the polyether sulfones according to the invention may be carried out, for example, by reacting corresponding quantities of 2,2'-dihydroxy-m-quaterphenyl and, optionally, another aromatic dihydroxy compound containing free hydroxyl groups with an aromatic dihalosulfone compound in an inert, polar organic solvent, preferably in an N-alkylated caprolactam, in the presence of an alkali compound or by reacting the alkali salts of 2',2'''-dihydroxy-m-quaterphenyl and optionally another aromatic dihydroxy compound with aromatic dihalosulfone compounds in an inert, highly polar organic solvent, preferably in an N-alkylated caprolactam.

Phenols corresponding to formula (II)

in which Ar represents $C_6$–$C_{30}$ aryl, may be used as further dihydroxy components together with 2',2'''-dihydroxy-m-quaterphenyl for the reaction in dipolar aprotic solvents.

The following aromatic dihydroxy compounds for example are suitable as comonomers for the production of the polyether sulfones according to the invention: mononuclear dihydric phenols, such as for example hydroquinone; polynuclear dihydroxy compounds, such as for example 4,4'-dihydroxydiphenyl; bisphenols, such as for example 2,2-bis(4-hydroxyphenyl)-propane, bis-(4-hydroxyphenyl)-methane, 4,4'-dihydroxybenzophenone, 4,4'-dihydroxydiphenyl ether, 4,4'-dihydroxydiphenyl sulfide, 1,4-bis-(4-dihydroxydiphenyl)-ether, 4,4'-dihydroxydiphenyl sulfide, 1,4-bis-(4-hydroxybenzoyl)-benzene, 1,3-bis-(4-hydroxybenzoyl)-benzene, etc. and derivatives thereof substituted in the nucleus (for example by $C_1$–$C_4$ alkyl). These compounds may be used individually or in admixture.

Preferred comonomers corresponding to formula (II) are 2,2-bis-(4-hydroxyphenyl)-propane, 4,4'-dihydroxydiphenyl, 4,4'-dihydroxydiphenyl ether, hydroquinone, 4,4'-dihydroxydiphenyl sulfone and 4,4'-dihydroxybenzophenone.

The aromatic dihalosulfone compounds used correspond to formula (III)

in which $Ar^1$ is an aromatic $C_6$–$C_{30}$ radical containing at least one sulfone group, X is a halogen atom (Fl, Cl, Br) which is attached to the last aromatic nucleus in the ortho position or para position.

Preferred aromatic dihalosulfone compounds correspond to the following formulae:

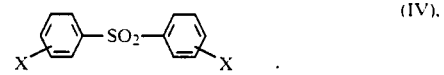

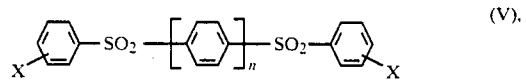

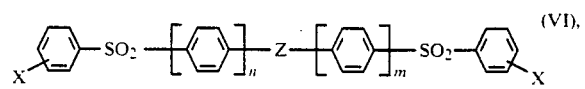

in which

X represents halogen (Fl, Cl, Br) attached to the last aromatic nucleus in the ortho position or para position, Z is a difunctional aliphatic radical containing 1 to 10 carbon atoms, a difunctional aromatic radical containing 6 to 18 carbon atoms, an ether group, a thioether group, a carbonyl group or a sulfone group and m and n are the numbers 1, 2 and 3.

The halogen atoms in the dihalosulfone compounds corresponding to formulae (IV, V, VI) are preferably chlorine and fluorine, more preferably chlorine.

Aromatic dihalosulfone compounds suitable for the reaction are known and include, for example, 4,4'-difluorodiphenyl sulfone, 2,4'-difluorodiphenyl sulfone, 4,4'-dichlorodiphenyl sulfone, 2,4'-dichlorodiphenyl sulfone, bis-1,4-(4'-fluoro-1'-sulfonylphenylene)-benzene, bis-1,4-(4'-chloro-1'-sulfonylphenylene)-benzene, bis-1,3-(4'-chloro-1'-sulfonylphenylene)-benzene, bis-4,4'-(4''-fluoro-1''-sulfonylphenylene)-diphenyl ether, bis-4,4'-(4''-chloro-1''-sulfonylphenylene)-diphenyl ether, etc. They may be used individually or in admixture.

The dihalosulfone compounds corresponding to formula (IV) preferably have a halogen atom in the para position on the last aromatic nucleus.

The particularly preferred aromatic dihalosulfone is 4,4'-dichlorodiphenyl sulfone.

The polyether sulfones according to the invention are preferably prepared in an inert, polar organic solvent, preferably in an N-alkylated caprolactam corresponding to formula (VII)

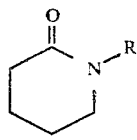
(VII), in which R represents $C_1$–$C_5$ alkyl.

A preferred solvent is, for example, N-methyl caprolactam, N-ethyl caprolactam, N-n-propyl caprolactam, N-isopropyl caprolactam; N-methyl caprolactam is particularly preferred.

The reaction of the 2',2''-dihydroxy-m-quaterphenyl and, optionally, another aromatic dihydroxy compound with an aromatic dihalosulfone compound containing free hydroxyl groups to form the new aromatic polyether sulfones is carried out in the presence of an alkali metal compound.

If, in accordance with the invention, the alkali metal salts of the free hydroxyl groups are reacted, there is no need to add another alkali metal compound.

Alkali metal compounds suitable for the reaction are, for example, hydroxides, carbonates, bicarbonates, fluorides, hydrides, alkoxides and alkylates of alkali metals (Na, K). Preferred alkali metal compounds in regard to the polycondensation rate, the color of the products and their thermal stability are carbonates and bicarbonates of alkali metals. The preferred alkali metal is potassium.

The reaction of 2',2''-dihydroxy-m-quaterphenyl and, optionally, other aromatic dihydroxy compounds corresponding to formula (II) containing free hydroxyl groups with aromatic dihalosulfone compounds corresponding to formula (III) to form aromatic polyether sulfones is carried out by dissolving the reaction components in the presence of the alkali metal compound in an N-alkylated caprolactam, gradually heating the reaction mixture to approximately 120° to 150° C., removing water of reaction formed at that temperature by the addition of an azeotropic entraining agent, subsequently removing the azeotropic entraining agent by distillation by increasing the reaction temperature and heating the reaction mixture to reaction temperatures in the range from 150° to 400° C., optionally under pressure (up to 10 bar). Where this procedure is adopted, the new aromatic polyether sulfones are formed in high yields in 0.1 h to 24 h.

To obtain high molecular weights, substantially equimolar quantities of the aromatic dihydroxy compounds are reacted with aromatic dihalosulfone compounds. To obtain a lower molecular weight as and where required, it may be advisable to use one of the reaction components in excess.

For the reaction of aromatic dihydroxy compounds containing free hydroxyl groups with aromatic dihalosulfone compounds to form aromatic polyether sulfones, the alkali metal compounds are used in substantially equivalent quantities to the free hydroxyl groups; 1.0 to 1.2 mol alkali compound is preferably used per hydroxyl group.

Compounds which form an azeotrope with water and which have a lower boiling point than the solvent used, for example benzene, toluene and xylene, preferably toluene may be used as the azeotropic entraining agent.

The reaction of alkali metal salts of the free hydroxyl groups of the aromatic dihydroxy compounds with aromatic dihalosulfone compounds to form aromatic polyether sulfones takes place analogously to the reaction of the reaction components containing free hydroxyl groups, optionally in the presence of an added alkali metal compound and an azeotropic entraining agent.

In the process according to the invention, the new aromatic polyether sulfones may be obtained in 0.1 h to 24 h at reaction temperatures in the range from 100° C. to 400° C. Preferred reaction temperatures are 150° C. to 280° C. while preferred reaction times are 0.5 h to 4 h.

The new aromatic polyether sulfones of high molecular weight produced in accordance with the invention have a relative viscosity of 1.50 to 3 (as measured in dichloromethane).

The relative viscosity is calculated in accordance with the following equation $$\eta_{rel} = \frac{\eta}{\eta_o}$$

where $\eta_o$ is the viscosity of the solvent used, $\eta$ is the viscosity of the polymer solution and $\eta_{rel}$ is the relative viscosity.

The aromatic polyether sulfones according to the invention may be used as moldings, films, fibers or surface coatings. They may be mixed in the form of blends with other polymers and fibers, aramide fibers, calcium carbonate, calcium silicate, etc.

EXAMPLE 1

1.0 mol 4,4'-dichlorodiphenyl sulfone, 0.5 mol 2',2''-dihydroxy-m-quaterphenyl, 0.5 mol 2,2-bis-(4-hydroxyphenyl)-propane, 1200 ml toluene and 1.2 mol $K_2CO_3$ are introduced into a 3000 ml three-necked round-bottomed flask equipped with a glass stirrer, a water separator with reflux condensor and a thermometer. The reaction mixture is heated with stirring until the water of reaction formed has been completely removed at an internal temperature of at most 150° C. (after about 3 hours). After removal of the water of reaction, the reaction mixture is heated to around 230° C., the toluene (entraining agent) being removed by distillation, followed by stirring for approximately 90 minutes.

To coagulate the polymer formed, the reaction mixture is precipitated while still hot in a 10% aqueous phosphoric acid solution, after which the polymer precipitated is filtered off and repeatedly suspended in water until it is free from electrolyte. To remove any residual quantities of solvent present, the polymer is thoroughly boiled with methanol, filtered and dried. The yield comprises more than 93% of the theoretical.

The relative viscosity of $\eta_{rel}$ of the dried product is determined in dichloromethane in a concentration of 1 g/100 ml and measures 1.585.

The position of the glass transition point $T_g$ is determined by means of a Mettler TA 3000 DSC; it is 209° C.

The polymer powder obtained by precipitation is colorless.

The melt flow index (MFI) determined in accordance with DIN 53 735 T.1 = ISO 1133 = ASTM D 1238 is 5.6 at 330° C.

EXAMPLE 2

The procedure is as in Example 1, except that 0.5 mol 2',2"-dihydroxy-m-quaterphenyl and 0.5 mol hydroquinone are used as the dihydroxy compounds. The white polymer obtained has a glass transition temperature $T_g$ of 209° C., a relative viscosity $\eta_{rel}$ of 1.633 and an MFI value of 1.1 at 330° C.

EXAMPLE 3

The procedure is as in Example 1, except that 0.5 mol 2',2"-dihydroxy-m-quaterphenyl and 0.5 mol 2,6-dihydroxy naphthalene are used as dihydroxy components. The white polymer obtained has a relative viscosity $\eta_{rel}$ of 1.685, a glass transition temperature $T_g$ of 214° C. and an MFI value of 1.0 at 330° C.

EXAMPLE 4

The procedure is as in Example 1 using 0.5 mol 2',2"-dihydroxy-m-quaterphenyl and 0.5 mol 4,4'-dihydroxy diphenyl ether as dihydroxy components. A white polymer powder is isolated. The polyether sulfone obtained has a relative viscosity $\eta_{rel}$ of 1.766, a glass transition temperature of 195° C. and an MFI value of 0.7 at 330° C.

COMPARISON EXAMPLE A 1 0 mol 4,4'-dichlorodiphenyl sulfone, 1.0 mol 4,4'-dihydroxydiphenyl, 1200 ml N-methyl caprolactam, 360 ml toluene and 1.2 mol $K_2CO_3$ are introduced into the apparatus described in Example 1. The reaction mixture is heated with stirring until the water of reaction has been removed at temperatures of around 150° C. The reaction mixture is then heated to around 230° C., the entraining agent being removed by distillation, followed by stirring for about another 2 hours.

The reaction product is worked up in the same way as in Example 1.

A polymer insoluble in dichloromethane with a glass transition temperature of 230° C. is obtained. The MFI value could not be determined because the melt viscosity of the product at 330° C. was so high that it did not flow out.

We claim:

1. Polyether sulfones of high molecular weight containing 2',2"-dihydroxy-m-quaterphenyl incorporated in a concentration of from 1% to 100%, based on the total quantity of bisphenol component used.

2. Aromatic polyether sulfones prepared from 2',2"-dihydroxy-m-quaterphenyl and, optionally, one or more other aromatic dihydroxy components and at least one aromatic dihalogen compound containing a sulfone group using an alkali compound in the presence of an inert, highly polar organic solvent.

3. A molding of the polyether sulfones claimed in claim 1.

* * * * *